United States Patent [19]

Larinoff

[11] 4,301,861
[45] Nov. 24, 1981

[54] STEAM CONDENSING APPARATUS

[75] Inventor: Michael W. Larinoff, Houston, Tex.

[73] Assignee: Hudson Products Corporation, Houston, Tex.

[21] Appl. No.: 712,590

[22] Filed: Aug. 9, 1976

Related U.S. Application Data

[63] Continuation-in-part of Ser. No. 585,952, Jun. 16, 1975, abandoned.

[51] Int. Cl.³ .................................................. F28B 7/00
[52] U.S. Cl. ........................................ 165/110; 60/693; 165/137; 165/DIG. 1; 261/DIG. 11
[58] Field of Search ................. 60/690, 691, 688, 689, 60/692, 693; 62/171; 165/110, 111, DIG. 1, 137; 261/DIG. 11

[56] References Cited

U.S. PATENT DOCUMENTS

| | | | |
|---|---|---|---|
| 2,303,146 | 11/1942 | Thomson | 60/693 |
| 2,545,926 | 3/1951 | Lau Bach | 62/171 |
| 2,858,677 | 11/1958 | Stone | 62/171 |
| 3,635,042 | 1/1972 | Spangemacher | 165/110 |
| 3,782,451 | 1/1974 | Cates | 261/DIG. 11 |
| 3,788,385 | 1/1974 | Delahunty | 60/690 |
| 3,794,304 | 2/1974 | Cates et al. | 261/DIG. 11 |
| 3,831,667 | 8/1974 | Kilgore et al. | 165/110 |
| 3,846,519 | 11/1974 | Spangemacher | 165/110 |
| 3,878,273 | 4/1975 | Anderson | 165/110 |
| 3,881,548 | 5/1975 | Budenholzer | 60/693 |
| 3,935,902 | 2/1976 | Heller et al. | 60/688 |
| 4,009,577 | 3/1977 | Allen | 60/692 |

Primary Examiner—Sheldon J. Richter
Attorney, Agent, or Firm—Marvin B. Eickenroht; Jennings B. Thompson

[57] ABSTRACT

There is disclosed apparatus for use in condensing steam from the turbine exhaust of a power plant or the like, comprising a steam condenser having means for circulating cooling medium therethrough in order to condense a portion of the steam from the turbine exhaust, a wet cooling tower in which the cooling medium is cooled by means of ambient air, and a dry cooling tower in which the other portion of the steam is condensed by means of ambient air.

9 Claims, 1 Drawing Figure

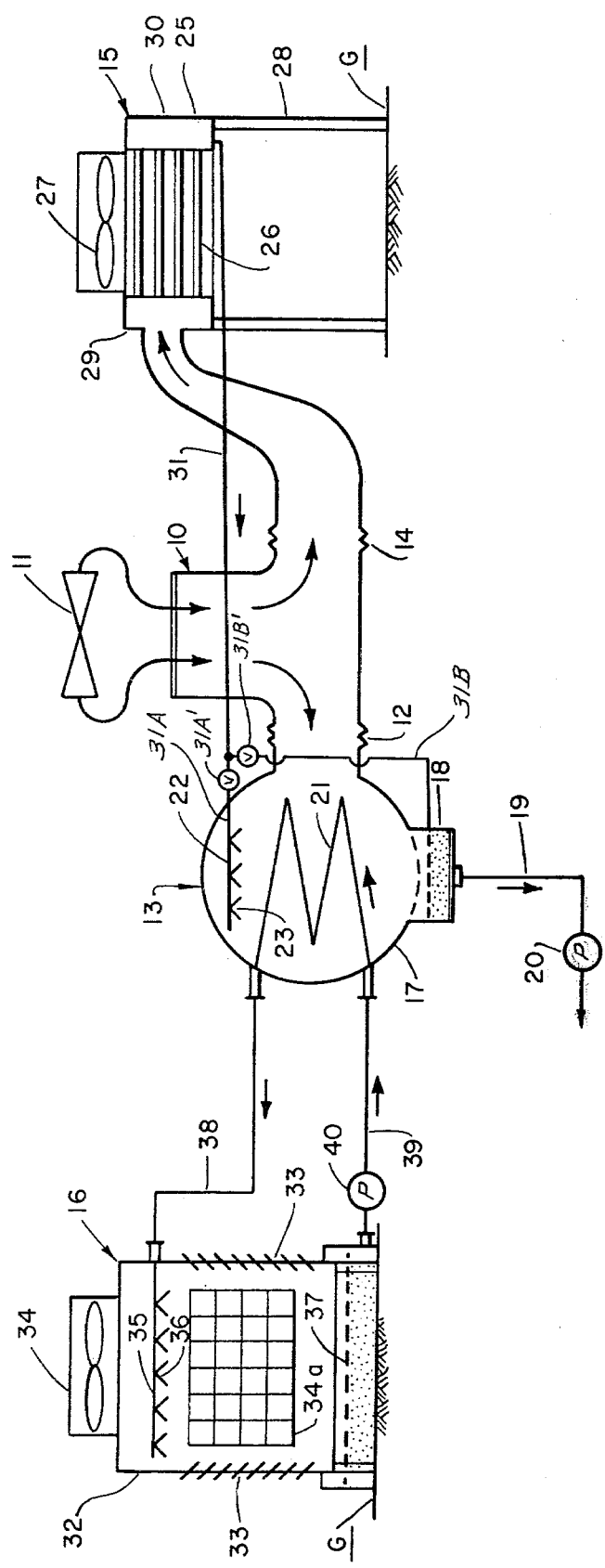

STEAM CONDENSING APPARATUS

This application is a continuation-in-part of U.S. Ser. No. 585,952, filed June 16, 1975, entitled "Steam Condensing Apparatus", now abandoned.

This invention relates generally to apparatus for use in condensing steam from the turbine exhaust of a power plant or the like wherein a portion of such steam is condensed within a steam condenser by means of cooling medium which in turn is cooled within a wet cooling tower section, and the other portion of the steam is condensed within a dry cooling tower section. More particularly, it relates to improvements in apparatus of this type in which the wet tower may be removed from service during cool weather in order to conserve make-up water in areas where water is scarce.

As used herein, a "wet" cooling tower section includes fill over which the air is caused to pass, an inlet including means for causing a medium to be cooled to pass over the fill, and an outlet having a water basin to collect the medium beneath the fill, and a "dry" cooling tower section includes a tube bundle over which the air is caused to pass, an inlet for introducing a medium to be cooled into the bundle, and an outlet for withdrawing the medium from the bundle. In the case of both sections, air flow may be natural draft or mechanical draft which is forced or induced by fans.

As used herein, a "steam condenser" includes a shell having an inlet to receive the steam, a hot well to collect the condensate, and means intermediate the inlet and hot well for passing a cooling medium through the shell in heat exchange relation with the steam. Furthermore, the condenser may be of the direct contact or mixing type in which the medium is sprayed into the shell and then withdrawn from the hot well, or it may be of the surface type in which the medium is circulated through tubes in the shell. When two or more mediums are passed through the shell, and at least one is sprayed into the shell, the condenser is also known as a direct contact or mixing type. Still further, the condenser may include one or more shells, each having a hot well, and the cooling medium may be passed through each shell in parallel or series flow.

Owners of power plants prefer wet cooling tower sections inasmuch as they require less capital investment than dry cooling tower sections. However, owners do not have this option if the source of make-up water for the wet section is limited. Hence, as set forth in Balcke U.S. Pat. No. 3,635,042, it has been proposed to use combined wet-dry cooling tower sections, with the dry section being used at all times while the wet section is brought into use only during the warmer weather.

FIG. 1 of the Balcke patent shows apparatus of the particular type with which present application is concerned. However, the wet and dry sections are built into a single tower, which requires that tower be of costly manufacture. Also, this arrangement of both sections in a single tower subjects tube bundles of the dry section to corrosion from the drift and water vapor from the wet section. Furthermore, if the circulating water flow is in series, as disclosed in certain of the embodiments of the Balcke apparatus, the dry section, which is virtually maintenance free, must be taken out of service during the frequent inspection and maintenance of the wet tower section. Still further, since both sections are built into the same tower, the design of each is controlled by the other insofar as air flow is concerned—i.e., either mechanical or natural draft.

In the above-described Balcke apparatus, condensate from the dry cooling tower section is returned to the boiler through a conduit connecting with the outlet conduit from the steam condenser. Thus, it would be necessary, in order to increase the plant cycle efficiency during cooler weather (when the wet tower is not in operation) by heating the condensate before return to the boiler, preferably to saturation temperature, to provide a heating tank, a storage hot well, and possibly separate condensate pumps.

An object of this invention is to provide apparatus of this type which permits the use of conventional cooling equipment.

Another object is to provide such apparatus in which the dry tower section is not corroded by drift and water vapor from the wet tower section.

A further object is to provide such apparatus which does not require that the dry section be taken out of service during inspection and maintenance of the wet section.

Still another object is to provide such apparatus in which the type of air flow through each tower section may be best suited to that particular section.

Yet a further object is to provide such apparatus which is capable of accomplishing two or more of the foregoing objects.

Yet another object is to provide such apparatus in which both condensate streams are handled with a single hot well and a single set of condensate pumps.

A still further object is to provide apparatus of the type described in the foregoing object in which condensate from the dry tower section is heated to saturation temperature, prior to return to the power cycle, without the need for a separate heating tank.

These and other objects are accomplished, in accordance with the illustrated embodiment of the invention, by apparatus of this type in which each of the wet and dry cooling tower sections comprises an individual tower separate and distinct from the other tower, thereby permitting each tower section to be of conventional, proven construction, preventing the dry tower section from being corroded by drift and vapor from the separate and distinct wet tower, and enabling the dry tower section to be maintained in service while the wet tower section is being inspected and maintained. Still further, the user of such apparatus has the option of using the same or different types of air flow—i.e., mechanical or natural draft—in the two towers, depending on the economics.

In accordance with a further novel aspect of the present invention, the outlet from the tube bundle of the dry tower is connected with the steam condenser, so that condensate from the dry tower flows into the hot well of the condenser. More particularly, the connection is arranged to introduce the condensate into the steam zone of the condenser where it is dispersed by suitable means such as sprays to cause it to intimately contact the steam before entering the condenser hot well. Thus, condensate from the dry tower is reheated to saturation temperature without the necessity of a separate heating tank, and both the wet and dry systems make use of a common hot well in each shell and condensate pumps, thereby resulting in a substantial cost saving.

Preferably, intimate contact of the steam with the condensate is promoted by causing the condensate to cascade downwardly over the tubes within the condenser through which the cooling medium from the wet tower is adapted to be circulated. However, in order to avoid degradation of the cooling performance of the wet tower during warmer temperatures, and thus while cooling medium is circulating through the tubes, additional means are provided for introducing the condensate into the condenser near the hot well during such warmer temperature. As will be appreciated, there is little need for reheating the condensate during these warmer temperatures since it is normally not subcooled to any degree.

The embodiment of the apparatus illustrated in the single FIGURE of the drawings includes a steam duct or manifold 10 having an inlet adapted to receive steam from the turbine exhaust from a power plant or the like which is indicated diagrammatically at 11. The duct 10 has a first branch 12 leading to a surface type steam condenser 13 in which a portion of the steam is condensed by means of a medium cooled within a wet type cooling tower 16, and a second branch 14 leading to a dry type cooling tower 15 in which the remaining portion of the steam is condensed. As will be described to follow, condensate of the condensed steam within dry tower 15 is introduced into the condenser 13, and returned to the power cycle with the condensate which is condensed in the condenser. The condenser 13 as well as the duct 10 are disposed within the power plant proper, while each of the dry and wet cooling towers 15 and 16, respectively, are supported on ground level G outside of the plant.

Condenser 13 comprises a shell 17 having an inlet in its right side for connection with branch 12 of housing 10, and a hot well 18 in its lower end for collecting steam which is condensed therein as well as that which is condensed within the dry tower and introduced into the shell. Condensate is returned to the power cycle by means of a pump 20 disposed within a conduit 19 connecting an outlet from the shell in the lower end of the hot well. The surface condenser also includes tubes 21 disposed within the shell 17 which circulate cooling medium cooled in wet tower 16 in heat exchanger relation with the steam entering the condenser shell through branch 12.

As previously described, during cold weather, when the wet tower is out of service and thus cool water or other medium is not being circulated through tubes 21, condensate from the dry tower 15 is introduced into the steam zone of the condenser shell, and, more particularly above tubes 21 by means of spray heads 23 mounted on a manifold 22 or perforations in the manifold. Thus, as previously mentioned, the condensate is caused to cascade over the tubes and thus to be intimately contacted by the steam as it passes downwardly into the hot well 18, where it is collected with condensate of the steam condensed in the shell of the condenser 13. During warm weather, however, when the wet tower is in service and thus a cooling medium is circulating through the tubes, condensate from dry tower 15 is instead introduced into the condenser shell near the hot well. In this way, the condensate is kept out of control with the tubes so as to avoid degrading the heat exchange capacity thereof. In either event, the condensate is returned to the power cycle through the same hot well and with the same pump (or sets of hot wells and pumps in the case of multiple shells) as the steam is condensed in the shell.

As shown, dry tower 15 is of the induced draft type comprising a housing 25 having at least one bundle of tubes 26 extending thereacross, and a fan 27 mounted in its open upper end. The housing is mounted on legs 28 with its open lower end above ground level G so that ambient air is drawn upwardly over the bundle of tubes 26 as it is drawn upwardly through the fan 27.

The second branch 14 of duct 10 connects with an inlet to a header 29 on one end of the bundle, and another header 30 connects with the opposite end of the bundle so as to receive condensate of the steam condensed in the tubes. A conduit 31 connecting the lower end of an outlet from the header 30 is in turn connected with branches 31A and 31B leading, respectively, to the manifold 22 extending into the condenser shell, and to the hot well 18.

As shown, there is a valve 31A' in branch 31A and a valve 31B' in branch 31B. Thus, during cold weather, valve 31A' may be closed and valve 31B' opened to cause condensate to be introduced directly into the hot well. Then, during warm weather, valve 31A' may be opened and valve 31B' closed to cause condensate to be introduced into the steam zone of the condenser above tubes 21.

Wet cooling tower 16 is also of the induced draft type comprising a housing 32 having louvers 33 at its opposite sides and a fan 34 mounted on its open upper end. Fill 34a is mounted within the housing beneath the fan 34 and opposite the louvers 33, so that ambient air is caused to pass therethrough as it is drawn through the louvers upwardly through the upper end of the housing.

The raw water to be cooled in the wet tower is introduced into a manifold 35 extending into the housing above the fill 34a and sprayed onto the fill by means of heads 36 mounted on the manifold. Thus, the water is caused to flow over the fill and into a water basin 37 in the lower end of the housing. The water is introduced into the manifold by means of a conduit 38 connecting with the upper ends of tubes 21, and is withdrawn from the water basin by means of a conduit 39 connecting with the lower ends of the tubes. A pump 40 is disposed within conduit 39 so that, as indicated by the arrows in the drawing, the water is circulated through the wet tower and into and through the tubes in surface condenser 13, for purposes previously described.

Although each of the wet and dry towers is shown to be of the induced draft type, it will be understood that either or both may instead be of a natural draft type. It will also be understood that although steam condenser 13 is shown to comprise a single shell, it may comprise two or more shells, in which case, of course, there would be a corresponding number of sections of tubes 21. Also, of course, the tubes may be connected either in parallel or series.

As previously described, this invention contemplates that dry tower 15 will be in service at all times, while the wet tower 16 may be removed from service during cooler weather, as by stopping of pump 40 so as to interrupt circulation of cooling medium through the condenser 13. On the other hand, during hot weather, the wet tower will be in service. During cold weather, the capacity of the dry tower may be reduced, as by conventional means, such as adjustment of the fan 27, louvered air openings into the housing, sectionalized tube bundles permitting individual bundles to be removed from service, or the like.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for use in condensing steam from the turbine exhaust of a power plant or the like, comprising means for receiving steam from the turbine exhaust and dividing it into first and second branches, a steam condenser having an inlet for receiving steam from the first branch, a hot well to receive condensed steam, and an outlet from the hot well, means returning condensate from the outlet to the power cycle, cooling tower means having a wet section and a dry section, the wet section including fill over which ambient air is caused to pass, an inlet having means for distributing a cooling medium over the fill, and an outlet including a water basin to collect the medium beneath the fill, means connecting the inlet and outlet of the wet tower section with tubes within the steam condenser for circulating said medium through the tubes in heat exchange relation with the steam, the dry section including a tube bundle over which ambient air is caused to pass, an inlet to the bundle for receiving steam from the second branch, and an outlet from the bundle, and means for introducing condensate from the bundle into the condenser.

2. Apparatus of the character defined in claim 1, wherein the cooling tower means includes separate wet and dry cooling towers.

3. Apparatus for use in condensing steam from the turbine exhaust of a power plant or the like, comprising means for receiving steam from the turbine exhaust and dividing it into first and second branches, a steam condenser having an inlet for receiving steam from the first branch, a hot well to receive condensed steam, and an outlet from the hot well, means for returning condensate from the outlet to the power cycle, cooling tower means having a wet section and a dry section, the wet section including fill over which ambient air is caused to pass, an inlet having means for distributing a cooling medium over the fill, and an outlet including a water basin to collect the medium beneath the fill, means connecting the inlet and outlet of the wet tower section with tubes within the steam condenser for circulating said medium through the tubes in heat exchange relation with the steam, the dry section including a tube bundle over which ambient air is caused to pass, an inlet to the bundle for receiving steam from the second branch, and an outlet from the bundle, and means for introducing condensate from the bundle into the condenser and causing it to be intimately contacted by the steam therein.

4. Apparatus of the character defined in claim 3, wherein said last-mentioned means includes a large surface area within the condenser over which the condensate is caused to cascade.

5. Apparatus of the character defined in claim 3, wherein the cooling tower means includes separate wet and dry cooling towers.

6. Apparatus of the character defined in claim 3, wherein said last-mentioned means includes connecting the outlet of the bundle with spray heads within the condenser.

7. Apparatus of the character defined in claim 6, wherein said last-mentioned means also includes a large surface area within the condenser over which the condensate from the spray heads is caused to cascade.

8. Apparatus for use in condensing steam from the turbine exhaust of a power plant or the like, comprising means for receiving steam from the turbine exhaust and dividing it into first and second branches, a steam condenser having an inlet for receiving steam from the first branch, a hot well to receive condensed steam, and an outlet from the hot well, means for returning condensate from the outlet to the power cycle, cooling tower means having a wet section and a dry section, the wet section including fill over which ambient air is caused to pass, an inlet having means for distributing a cooling medium over the fill, and an outlet including a water basin to collect the medium beneath the fill, means connecting the inlet and outlet of the wet tower section with tubes within the steam condenser for circulating said medium through the tubes in heat exchange relation with the steam, the dry section including a tube handle over which ambient air is caused to pass, an inlet to the bundle for receiving steam from the second branch, and an outlet from the bundle, means for introducing the condensate into the condenser above the tubes so that it is caused to cascade thereover, when the wet tower is not operating during colder ambient temperatures, and for introducing the condensate into the condenser near the hot well, when the wet tower is operating during warmer ambient temperatures.

9. Apparatus of the character defined in claim 8, wherein the cooling tower means includes separate wet and dry cooling towers.

* * * * *